United States Patent
Liu et al.

(10) Patent No.: US 7,292,828 B1
(45) Date of Patent: Nov. 6, 2007

(54) MINIATURIZED MULTICHANNEL TRANSMITTER AND WIRELESS TELEMETRY SYSTEM

(75) Inventors: Chung-Chiun Liu, Cleveland Heights, OH (US); Edward O'Connor, Garfield Heights, OH (US); Kingman P. Strohl, Shaker Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 767 days.

(21) Appl. No.: 10/656,651

(22) Filed: Sep. 5, 2003

Related U.S. Application Data

(60) Provisional application No. 60/408,437, filed on Sep. 5, 2002.

(51) Int. Cl.
  *H04B 1/02* (2006.01)
(52) U.S. Cl. .................. 455/91; 455/127.3; 455/323; 455/333
(58) Field of Classification Search ............ 455/127.3, 455/91, 128, 85–86, 84, 87–88, 575.1, 90.3, 455/115.1, 103, 66.1, 67.11, 67.13, 550.1, 455/80, 323, 333, 291, 311, 313–316, 341; 333/101, 109, 115–116; 330/310, 286, 277; 257/347, 352
See application file for complete search history.

(56) References Cited

U.S. PATENT DOCUMENTS

| | | | | |
|---|---|---|---|---|
| 5,886,539 | A * | 3/1999 | Bell | 326/82 |
| 6,215,360 | B1 * | 4/2001 | Callaway, Jr. | 330/310 |
| 6,483,398 | B2 * | 11/2002 | Nagamori et al. | 333/116 |
| 2003/0027539 | A1 * | 2/2003 | Nagamori et al. | 455/234.1 |
| 2004/0242183 | A1 * | 12/2004 | Sugar et al. | 455/333 |
| 2005/0101251 | A1 * | 5/2005 | Kondo et al. | 455/41.2 |
| 2005/0113035 | A1 * | 5/2005 | Kyongyop | 455/90.3 |
| 2005/0119025 | A1 * | 6/2005 | Mohindra et al. | 455/552.1 |
| 2005/0191968 | A1 * | 9/2005 | Tabayashi et al. | 455/74 |
| 2005/0227626 | A1 * | 10/2005 | Stoddard et al. | 455/67.11 |

* cited by examiner

*Primary Examiner*—Pablo N. Tran
(74) *Attorney, Agent, or Firm*—Kirkpatrick & Lockhart Nicholson Graham LLP

(57) ABSTRACT

A multichannel wireless telemetry system is disclosed. The system includes a transmitter and a receiver in communication with the transmitter. The transmitter includes a signal processing chip. The signal processing chip includes a plurality of input preamplifiers, a plurality of selective second amplifiers, a subcarrier oscillator connected to the selective second amplifiers, a timing circuit connected to the subcarrier oscillator, a calibration circuit connected to the timing circuit, and a 1-of-several decoder connected to the timing circuit. Each selective second amplifier is connected to a different input preamplifier.

43 Claims, 9 Drawing Sheets

MINIATURIZED MULTICHANNEL TRANSMITTER AND WIRELESS TELEMETRY SYSTEM

CROSS-REFERENCE TO RELATED APPLICATION

This application claims priority under 35 U.S.C. § 119(e) from provisional U.S. Patent Application Ser. No. 60/408,437 filed Sep. 5, 2002, which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. HL-64278 awarded by National Institutes of Health.

BACKGROUND

The present application is related, generally and in various embodiments, to a miniaturized multichannel wireless telemetry system. More particularly, the present application relates to a miniaturized multichannel wireless telemetry system for biopotential monitoring.

Neurophysiological investigations of function require the collection of biophysical parameters in unrestrained animals. Conventional techniques involve wire connections and restraint tethering which limit animal movement and recording conditions. Although the use of various wireless telemetry systems have been previously proposed, the systems suffer various shortcomings and limitations.

Some multichannel telemetry systems use sequential conversion of input signals to a current to control a current-controlled oscillator based upon a monolithic chip. The monolithic chip has an overall size of approximately 3 mm×3 mm, is all complementary bipolar (BJT), and contains a single set of amplifiers, reference circuits and a CCO (current controlled oscillator). The overall package size of these systems, not including the battery, is often relatively large, thereby precluding use in small animals. For example, the overall package size of one of these systems was approximately 3.8 cm×2.7 cm×0.8 cm. The systems also lack clocking provisions, and require the addition of commercial CMOS chips. Other limitations include an inability for preamplification, buffering, filtering, or providing proper input impedance.

Other multichannel telemetry systems utilize time-sharing sequential multiplexing. However, the overall size of the systems, not including the battery, are still relatively large and are designed for signals such as strain gauges or EKG rather than weaker signals such as EEG and EMG. For example, the overall size of one of these systems was approximately 8 cm×2 cm×1 cm.

Other multichannel telemetry systems utilize a miniaturized EEG transmitter, measuring approximately 1.95 cm×1.6 cm×0.63 cm. The EEG transmitters used in these systems typically include tightly packed discrete components that are difficult to assemble. One such EEG transmitter is adapted to be anchored to the skull of a small animal and includes two asymmetric channels, but lacks remote on/off capability. Another such EEG transmitter includes four single-ended channels, rather than differential channels.

SUMMARY

In one general respect, this application discloses a miniaturized multichannel transmitter. According to various embodiments, the transmitter includes a signal processing chip. The signal processing chip includes a plurality of input preamplifiers, a plurality of selective second amplifiers, a subcarrier oscillator connected to the selective second amplifiers, a timing circuit connected to the subcarrier oscillator, a calibration circuit connected to the timing circuit, and a 1-of-several decoder connected to the timing circuit. Each selective second amplifier is connected to a different input preamplifier.

In another general respect, this application discloses a miniaturized multichannel wireless telemetry system. According to various embodiments, the system includes a transmitter and a receiver in communication with the transmitter. The transmitter includes a signal processing chip. The signal processing chip includes a plurality of input preamplifiers, a plurality of selective second amplifiers, a subcarrier oscillator connected to the selective second amplifiers, a timing circuit connected to the subcarrier oscillator, a calibration circuit connected to the timing circuit, and a 1-of-several decoder connected to the timing circuit. Each selective second amplifier is connected to a different input preamplifier.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
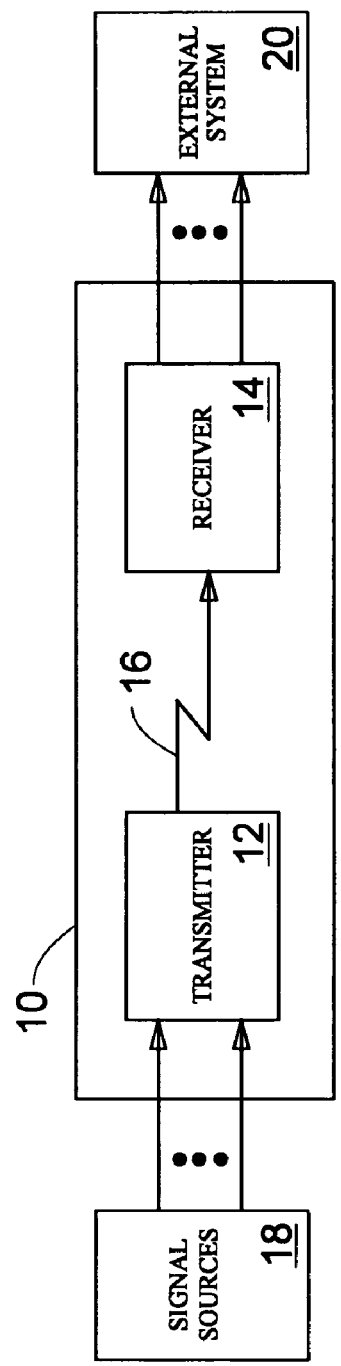
FIG. 1 illustrates a simplified block diagram of various embodiments of a multichannel wireless telemetry system.

FIG. 1 illustrates a simplified block diagram of various embodiments of a miniaturized multichannel wireless telemetry system 10. The system 10 may be utilized for monitoring signals associated with small animals such as mice or rats, and may include a transmitter 12, and a receiver 14 in communication with the transmitter 12 via a communication link 16. The communication link 16 may be, for example, a wireless RF communication link.

The transmitter 12 may receive input signals from signal sources 18 capable of measuring medical, biological, physiological, biopotential, and biochemical parameters. The input signals may include, for example, EEG signals, EMG signals, or signals representative of a particular temperature, pressure, or chemical concentration. The transmitter 12 may subsequently transmit information representative of the input signals via communication link 16. According to various embodiments, the overall size of the transmitter 12 may be approximately 10 mm×10 mm×5 mm.

The receiver 14 may receive the information transmitted from the transmitter 12, and may provide output signals indicative of the input signals received by the transmitter 12 from the signal sources 18. According to various embodiments, the receiver 14 may provide the output signals to an external system 20 capable of displaying, storing, and analyzing the output signals.

Figure 2:
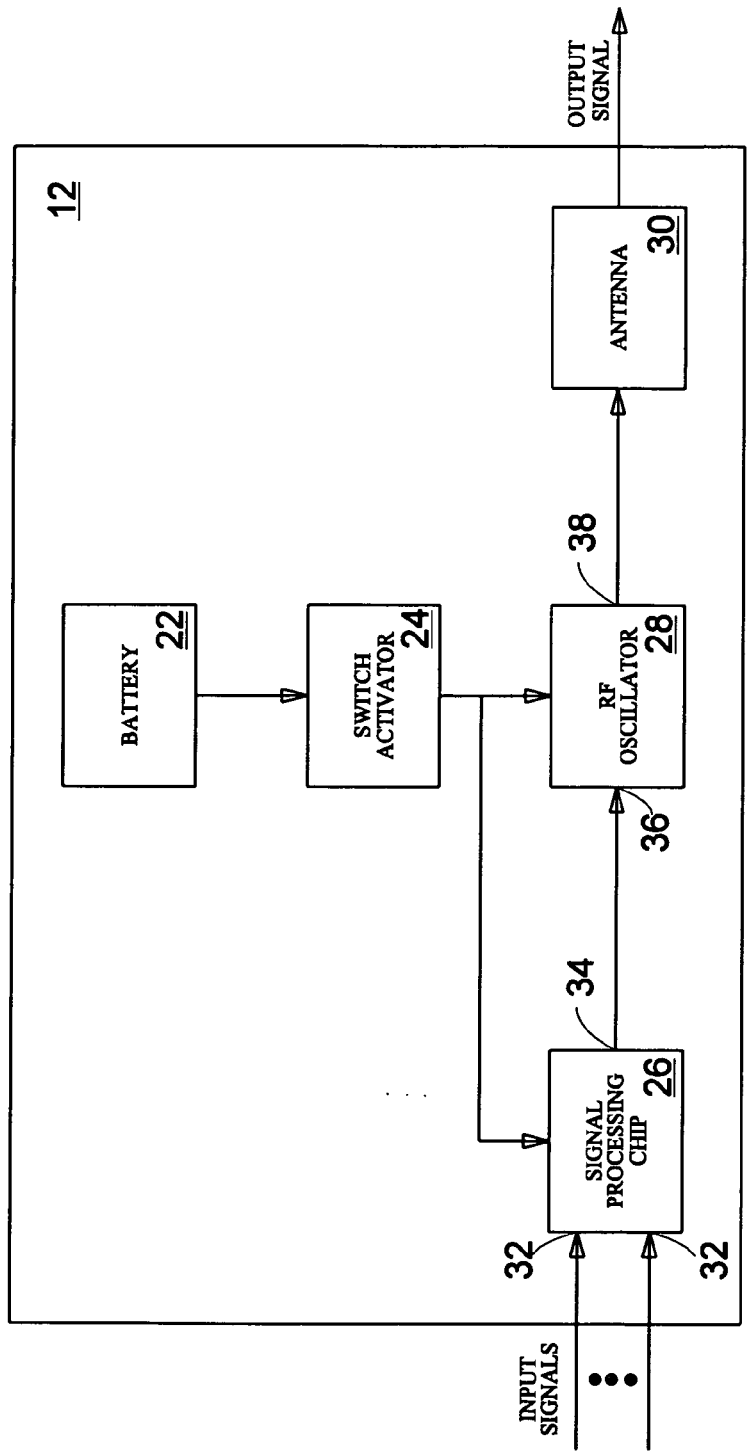
FIG. 2 illustrates a simplified block diagram of various embodiments of the transmitter of FIG. 1.

FIG. 2 illustrates a simplified block diagram of various embodiments of the transmitter 12 of FIG. 1. The transmitter 12 may include a battery 22, a switch activator 24, a signal processing chip 26, an RF oscillator 28, and an antenna 30.

The battery 22 may provide the power for the operation of the transmitter 12, and may be a relatively small battery such as, for example, a CR1025 watch cell manufactured by Panasonic or others and having a weight of approximately 0.6 grams. The switch activator 24 may be connected to the battery 22 and may be, for example, a hall-effect magnetic sensor. According to various embodiments, the switch activator 24 may be configured to provide the transmitter 12 with remote on-off capability. The signal processing chip 26 may include an on-chip on-off switch 31 as shown in FIG. 4. The on-off switch 31 may be a magnetically activated switch, and may be activated via the switch activator 24. The signal processing chip 26 may include a plurality of input terminals 32, and an output terminal 34. The signal processing chip 26 may receive a plurality of input signals, and will be described in more detail hereinbelow with respect to FIG. 3. The RF oscillator 28 may include an input terminal 36 connected to the output terminal 34 of the signal processing chip 26, and an output terminal 38. The antenna 30 may be connected to the output terminal 38 of the RF oscillator 28, and may radiate an airborne signal representative of the input signals received by the signal-processing chip 26.

Figure 3:
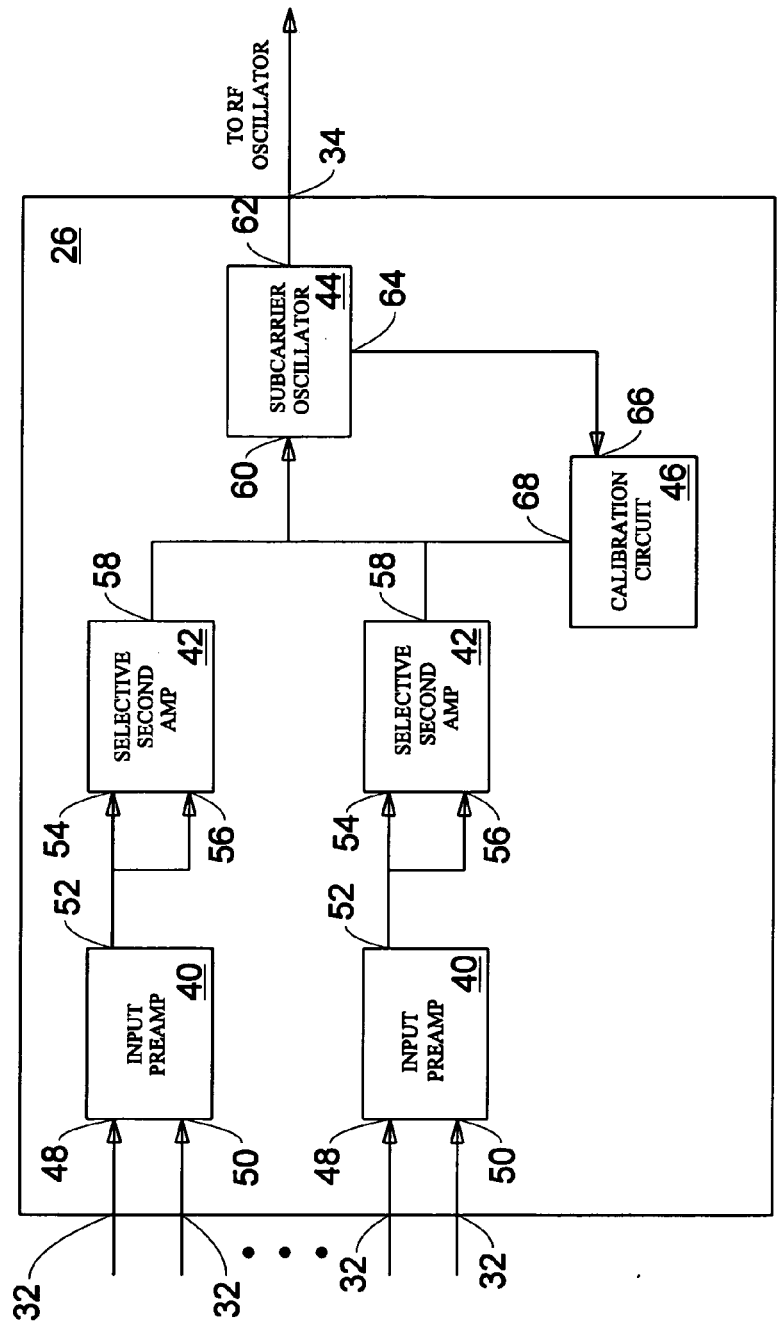
FIG. 3 illustrates a simplified block diagram of various embodiments of the signal processing chip of FIG. 2.
Figure 4:
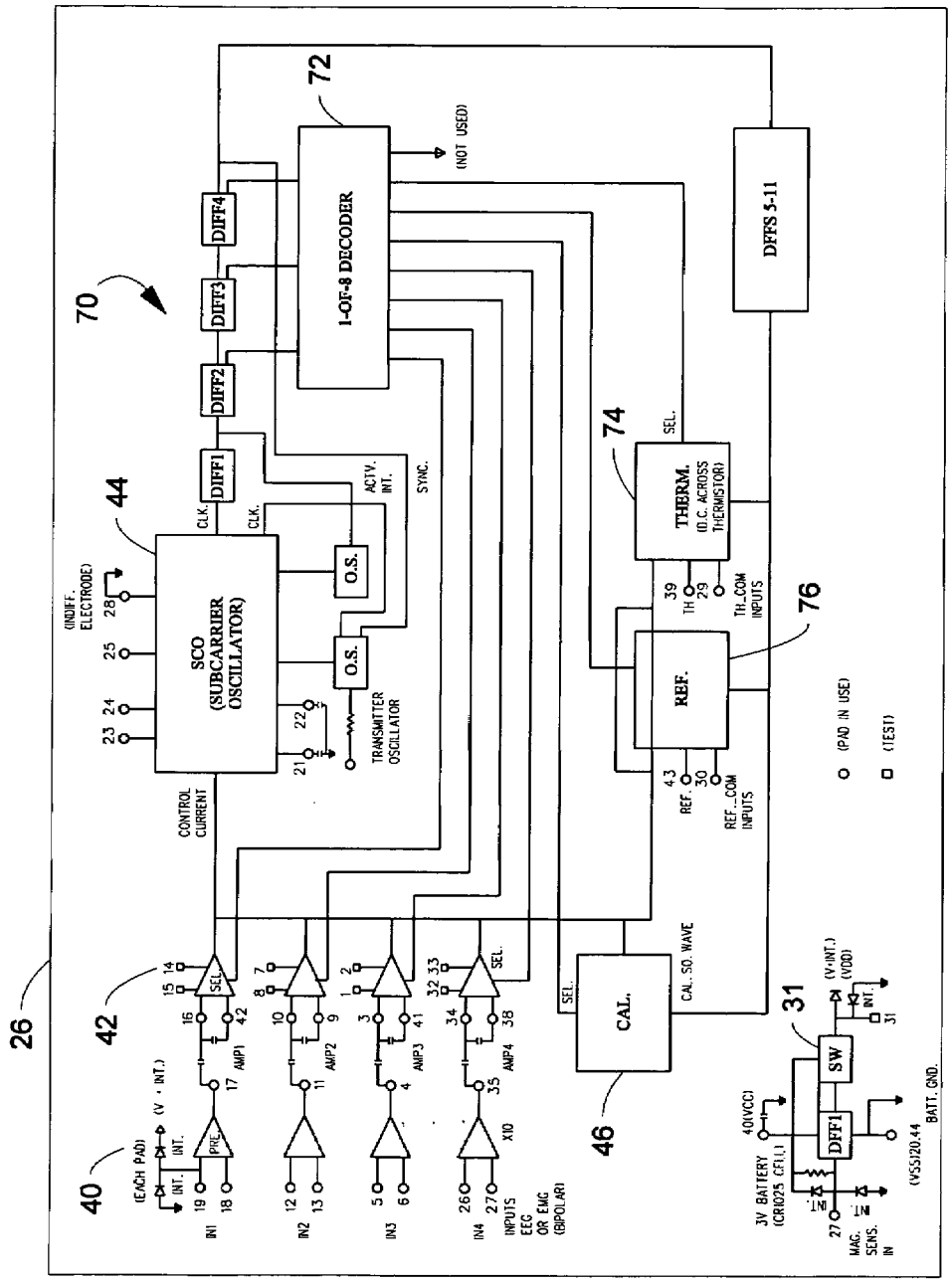
FIG. 4 illustrates a circuit diagram of various embodiments of the signal processing chip of FIG. 2.

FIG. 3 illustrates a simplified block diagram of various embodiments of the signal processing chip 26 of FIG. 2. As disclosed hereinbefore, the signal processing chip 26 may include a plurality of input terminals 32, and an output terminal 34. The signal processing chip 26 may also include a plurality of input preamplifiers 40, a plurality of selective second amplifiers 42, a subcarrier oscillator 44, and a calibration circuit 46.

The signal processing chip 26 may receive a different input signal at each input terminal 32, and each input signal may be indicative of a parameter measured by, for example, a biosensor. Each input preamplifier 40 may include first and second input terminals 48, 50, and an output terminal 52. The first and second input terminals 48, 50 of each input preamplifier 40 may be connected to input terminals 32 of the signal processing chip 26. According to various embodiments, each input preamplifier 40 may include first and second NPN transistors configured as an NPN differential pair with, for example, the emitter of the first NPN transistor directly connected to the emitter of the second NPN transistor. According to such embodiments, the base of the first NPN transistor may be biased by, for example, a first 400K resistor returned to +1.3V (approximately 2 diode drops), and the base of the second NPN transistor may be biased by, for example, a second 400K resistor returned to +1.3V. Each input preamplifier 40 may also include, for example, a 270K resistor connected between a power rail and the respective emitters of the first and second NPN transistors. Thus, the 270K resistor may be considered as a current supply resistor. With this configuration, the collector current associated with the first NPN transistor may represent one-half the current passing through the 270K resistor, and the collector current of the second NPN transistor may represent the other half of the current passing through the 270K resistor. According to such embodiments, the emitter current may be set to a low value to minimize flicker noise.

Each selective second amplifier 42 may include first and second input terminals 54, 56, and an output terminal 58. Each selective second amplifier 42 may be connected to a different input preamplifier 40. Thus, the first and second input terminals 54, 56 of a particular selective second amplifier 42 may be connected to the output terminal 52 of a particular input preamplifier 40. According to various embodiments, each selective second amplifier 42 may include one or more current mirrors to set the operating current of its internal stages or to act as amplifier stage loads to provide for proper summation of signals at its output. According to various embodiments, some of the current mirrors may be implemented using PNP devices. According to other embodiments, some of the current mirrors may be implemented using PMOS devices.

The subcarrier oscillator 44 may include an input terminal 60, and first and second output terminals 62, 64. The input terminal 60 may be connected to the output terminals 58 of the selective second amplifiers 42. The first output terminal 62 may be connected to the RF oscillator 28, either directly or via, for example, a pulse-generating circuit triggered by the output of the subcarrier oscillator 44. According to various embodiments, the subcarrier oscillator 44 may generate a lower frequency carrier that may be subsequently superimposed on the main carrier generated by the RF oscillator 28.

The calibration circuit 46 may include an input terminal 66 and an output terminal 68. The input terminal 66 may be connected to the second output terminal 64 of the subcarrier oscillator 44. The output terminal 68 may be connected to the input terminal 60 of the subcarrier oscillator 44. According to various embodiments, the calibration circuit 46 may output a reference signal that is fed into the subcarrier oscillator 44.

FIG. 4 illustrates a circuit diagram of various embodiments of the signal processor chip 26 of FIG. 2. The signal processing chip 26 may be implemented as an Application Specific Integrated Circuit (ASIC), and the overall size of the signal processing chip 26 may be approximately 2 mm×2 mm. The signal processing chip 26 may be a low power BiCMOS signal processor chip adapted to implementing a transmitter package having an very small overall size such as, for example, 1 cm×1 cm×0.5 cm. The signal processing chip 26 may receive input signals from the signal sources 18, then amplify, filter, and time division multiplex the signals to generate an output signal that is passed to the RF oscillator 28. Although only four input preamplifiers 40 and four selective second amplifiers 42 are shown in FIG. 4, the signal processing chip may include any number of input preamplifiers 40 and selective second amplifiers 42. For example, according to various embodiments, the signal-processing chip 26 may include eight input preamplifiers 40 and eight selective second amplifiers 42.

As illustrated in FIG. 4, the signal processing chip 26 may also include a timing circuit 70 that includes a plurality of toggle-connected type D flip-flops (DFF1–DFF11). The signal processing chip 26 may also include a 1-of-several decoder 72, a temperature circuit 74, a reference circuit 76, first and second monostable multivibrators 78, 80, and the on-off switch 31. The timing circuit 70 may be connected to the subcarrier oscillator 44, the calibration circuit 46, the 1-of-several decoder 72, the temperature circuit 74, the reference circuit 76, and the first and second monostable multivibrators 78, 80.

The 1-of several decoder 72 may be connected to the timing circuit 70, and to a select terminal (SEL) at each of the plurality of selective second amplifiers 42, the calibration circuit 46, the temperature circuit 74 and the reference circuit 76. According to various embodiments, the 1-of-several decoder 72 may be, for example, a 1-of-8 decoder. The temperature circuit 74 may include an input terminal connected to the timing circuit 70, a select terminal (SEL) connected to the 1-of several decoder 72, and an output terminal connected to an input terminal 60 of the subcarrier oscillator 44. The reference circuit 76 may include an input terminal connected to the timing circuit 70, a select terminal (SEL) connected to the 1-of several decoder 72, and an output terminal connected to the input terminal 60 of the subcarrier oscillator 44. The first and second monostable multivibrators 78, 80 may each be connected to the subcarrier oscillator 44 and the timing circuit 70.

With respect to the operation of the signal processing chip 26, the input preamplifiers 40 may receive input signals from biosensors as described hereinabove. The input preamplifiers 40 may introduce certain impedance characteristics to the biosensors, and may provide amplification and buffering of the input signals. The amplified and buffered input signals may be passed to the selective second amplifiers 42, which may convert the amplified and buffered input signals into an output current that may be fed into the subcarrier oscillator 44. Output currents from the calibration circuit 46, the temperature circuit 74 and the reference circuit 76 may also be fed into the subcarrier oscillator 44. The subcarrier oscillator 44 may provide for both data/reference encoding and multiplexing.

The first monostable multivibrator 78 may include a first block of monostable multivibrators. The first block of monostable multivibrators may be driven by an output of the subcarrier oscillator 44 and may generate the chip output and synchronization pulses that may be transmitted to the RF oscillator 28. According to various embodiments, gating may be used to combine the outputs of the first block of monostable multivibrators to generate the output pulses and the synchronization pulses. The output pulses may be in the form of a sequence of pulses that define the data channels, the calibration channel, the temperature channel and the reference channel. The synchronization pulses may be, for example, a pair of synchronization pulses separated by a short time interval, and may be placed between any two data intervals.

As shown in FIG. 4, an output of flip-flop DFF1 may be used to drive the second monostable multivibrator 80. The second monostable multivibrator 80 may include a second block of monostable multivibrators that may provide a minimum time interval between the second synchronization pulse of the pair of synchronization pulses and the start of the next data or calibration interval. D-flip flops DFF2–DFF4 may drive the inputs of the 1-of-several decoder 72. The 1-of-several decoder 72 may be configured so that only one of the several available decoder outputs goes high at any one time, and the outputs may go high in a sequential manner. Thus, according to various embodiments, only one of the calibration circuit 46, the temperature circuit 74, the reference circuit 76 or one of the selective second amplifiers 42 may be selected to provide a current to the subcarrier oscillator 44 at any one time. Additional toggle-connected D-flip-flops DFF5–DFF11 may divide down the output frequency of the subcarrier oscillator 44 to obtain a square wave that drives the calibration circuit 46. D-flip-flop DFF12 may serve to toggle the on-off switch 31 in response to triggering by the switch activator 24.

Figure 5:
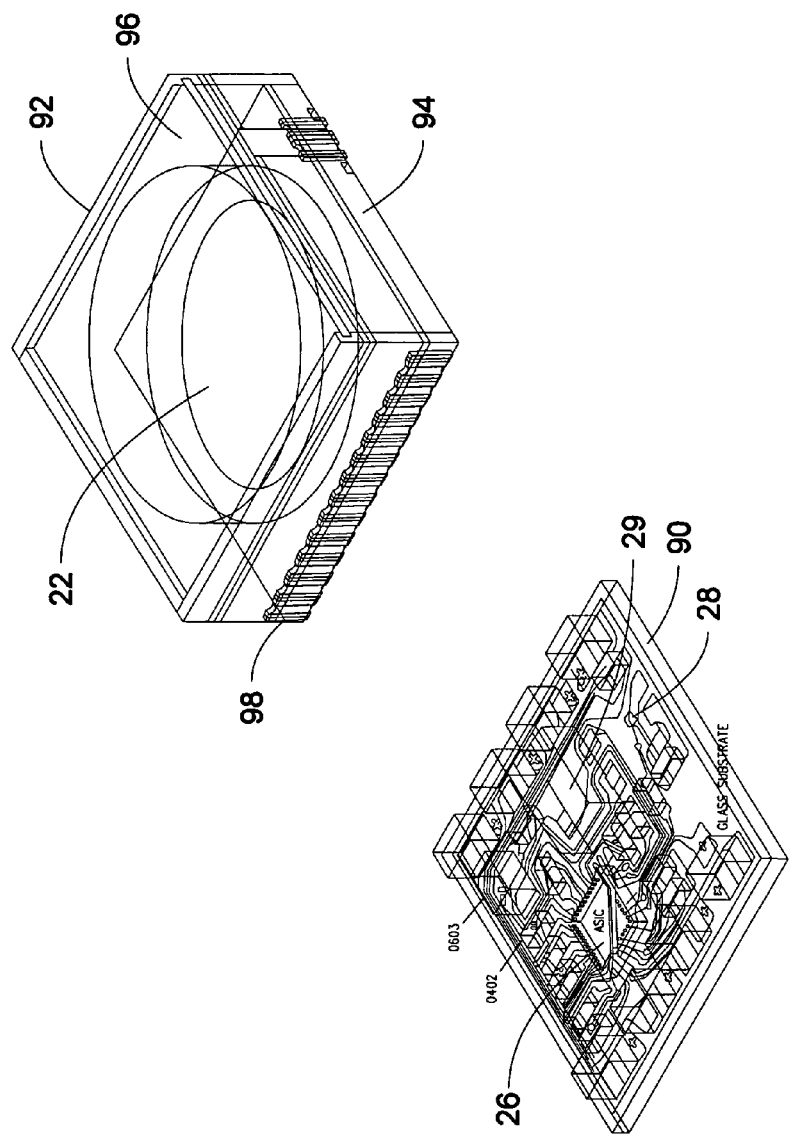
FIG. 5 illustrates various embodiments of the transmitter of FIG. 1.

FIG. 5 illustrates various embodiments of the transmitter 12 of FIG. 1. According to this embodiment, the transmitter 12 also includes a substrate 90 and a housing 92. The substrate 90 may be, for example, a glass substrate having a very small physical size, and may have the switch activator 24, the signal-processing chip 26, and the RF oscillator 28 mounted thereon. The housing 92 may be utilized to enclose the substrate 90, the components mounted on the substrate 90, and the battery 22. The housing may include a base portion 94 and a lid portion 96, and may be fabricated from a machinable material such as, for example, ceramic or alumina. The base portion 94 may include a plurality of microterminals 98 for connection to leads from sensors such as, for example, biosensors. The microterminals 98 may be connected to the input terminals 32 of the signal-processing chip 26 via thin leads (not shown). The lid portion 96 may be utilized to hold the battery 22 in its intended position. According to various embodiments, the lid portion 96 may be a sliding lid portion, thereby allowing easy access to the battery 22.

Figure 6:
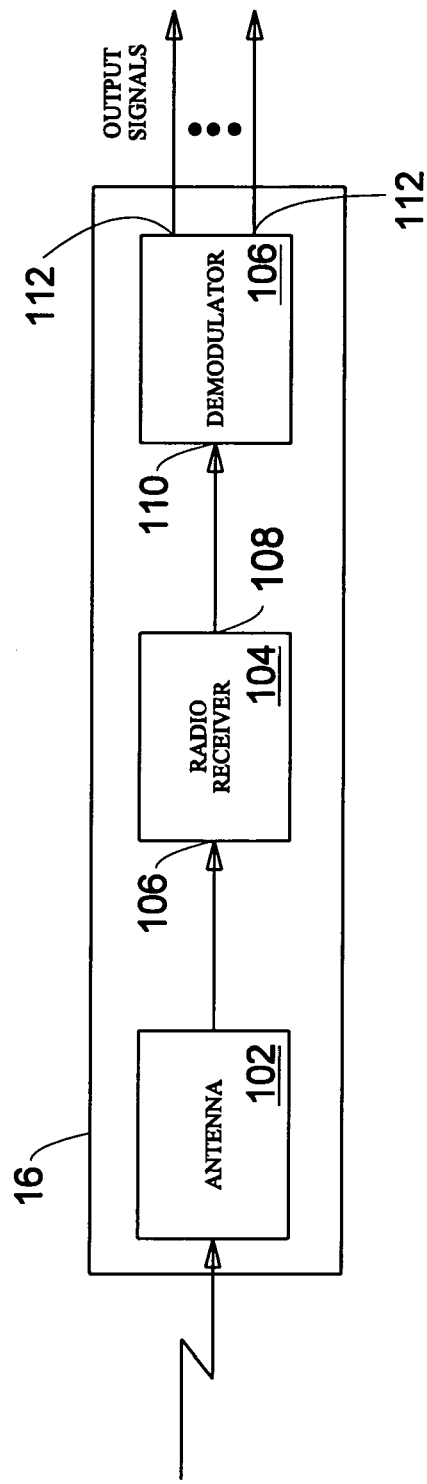
FIG. 6 illustrates a simplified block diagram of various embodiments of the receiver of FIG. 1.

FIG. 6 illustrates a simplified block diagram of various embodiments of the receiver 14 of FIG. 1. The receiver 14 may include an antenna 102, a radio receiver 104, and a demodulator 106. The antenna 102 may receive the airborne signal transmitted from the transmitter 12, and may convert the airborne signal to an electrical signal representative of the airborne signal. The antenna 102 may be, for example, a half-dipole antenna or a loop antenna. The radio receiver 104 may include an input terminal 106 connected to the antenna 102, and an output terminal 108. The demodulator 106 may include an input terminal 110 connected to the output terminal 108 of the radio receiver 104, and a plurality of output terminals 112. The output terminals 112 may be connected to an external system such as, for example, the external system 20 of FIG. 1, capable of displaying, storing, and analyzing the output signals of the receiver 14.

Figure 7:
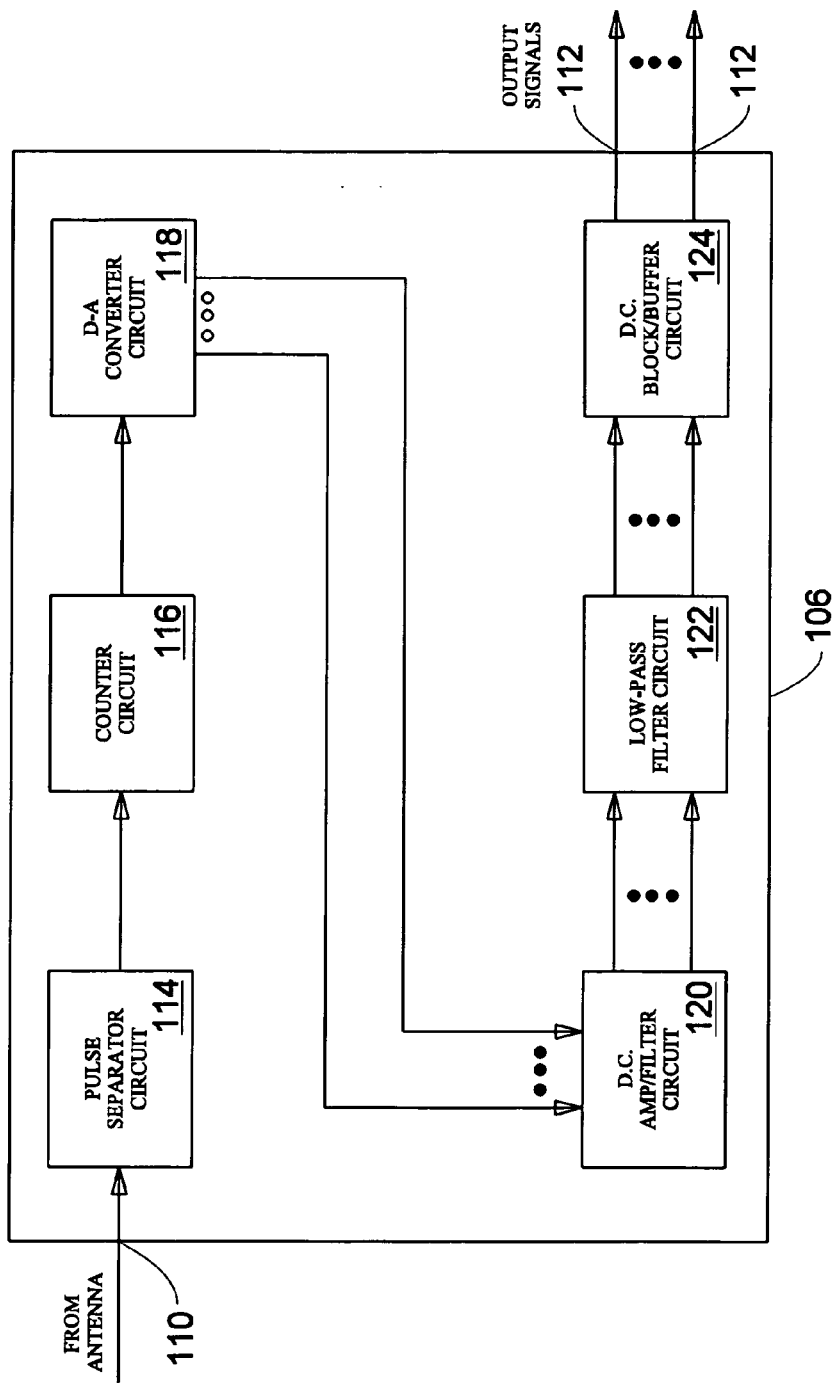
FIG. 7 illustrates a simplified block diagram of various embodiments of the demodulator of FIG. 6.

FIG. 7 illustrates a simplified block diagram of various embodiments of the demodulator 106 of FIG. 6. As disclosed hereinbefore, the demodulator 106 may include an input terminal 110 and a plurality of output terminals 112. The demodulator 106 may also include a pulse separator circuit 114, a counting circuit 116, a digital-to-analog (D-to-A) converter circuit 118, a D.C. amplifier/filter circuit 120, a low pass filter circuit 122, and a D.C. block/buffer circuit 124.

The pulse separator circuit 114 may be used separate the active interval, or channel pulses, from the synchronization pulses transmitted by the transmitter 12. The active pulses may then be forwarded to the counting circuit 116, which may generate a binary count at the end of each active interval of the transmitter 12. The binary count may then be applied to the D-to-A converter circuit 118, which may convert the binary count to an analog voltage representative of the binary count. The output of the D-to-A converter circuit 118 may be passed through the D.C. amplifier/filter circuit 120, which may eliminate noise such as, for example, bit noise introduced by the D-to-A converter circuit 118. The output of the D.C. amplifier/filter circuit 120 may be passed through the low pass filter circuit 122, which may limit the channel bandwidth to a bandwidth such as, for example, 100 Hz. The output of the low pass filter circuit 122 may be passed through the D.C. block/buffer circuit 124, which may minimize or eliminate D.C. offset and lower the output impedance of the demodulator 106. The outputs of the D.C. block/buffer circuit 124 may be passed to the output terminals 112 of the demodulator 106.

Figure 8:
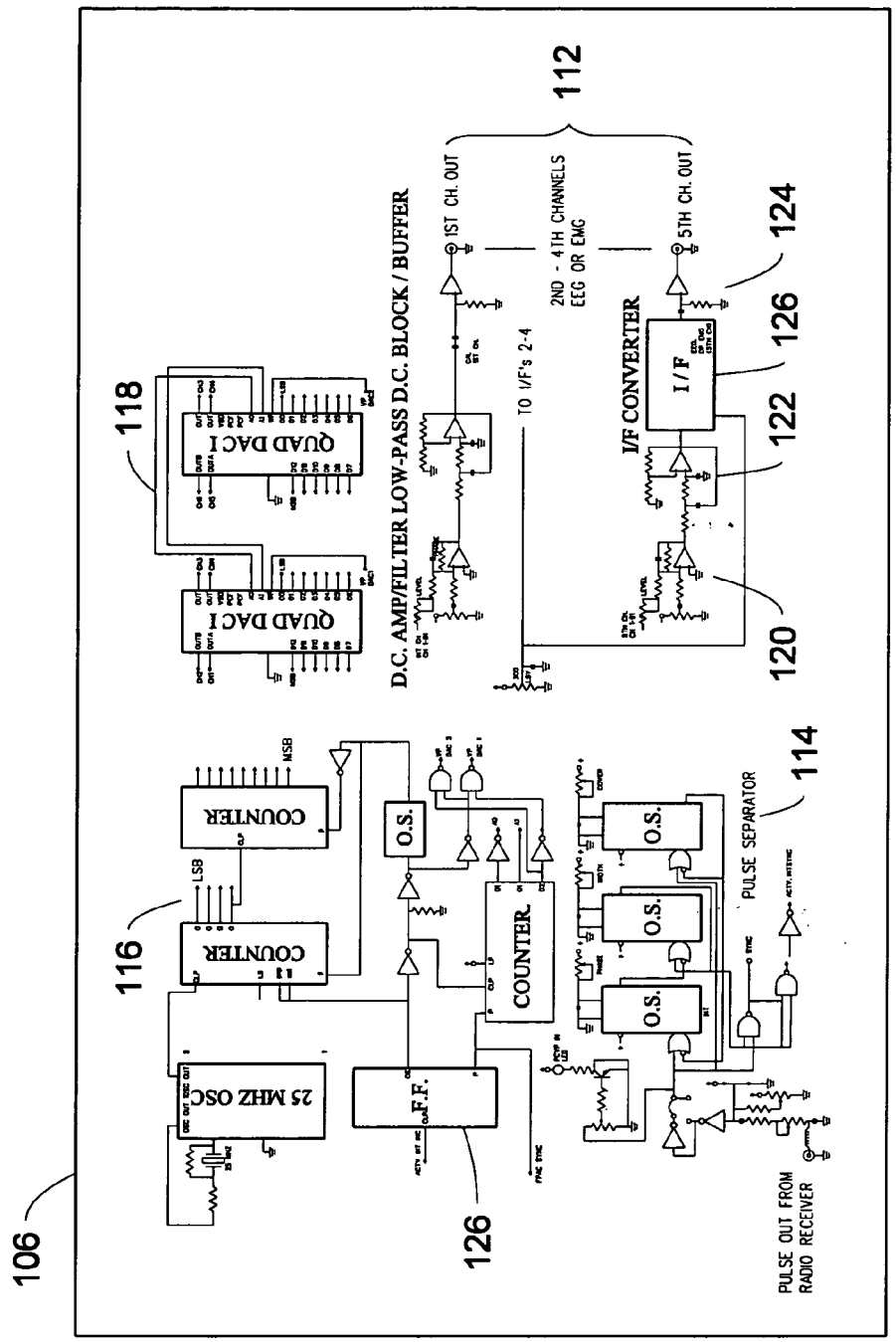
FIG. 8 illustrates a circuit diagram of various embodiments of the demodulator of FIG. 6.

FIG. 8 illustrates a circuit diagram of various embodiments of the demodulator 106 of FIG. 6. As shown in FIG. 8, the demodulator 106 may also include a flip-flop 126 connected to the pulse separator circuit 114, and the active pulses passed from the pulse separator circuit 114 may be applied to the clock input of the flip-flop 126. The output pulses of the flip-flop 126 may be used to gate a clock input of one of the counters of the counting circuit 116. According to various embodiments, the clock input may be a 25 MHz clock input.

As shown in FIG. 8, the demodulator 106 may include a plurality of output terminals 112. One output terminal 112 may be associated with the calibration channel and four output terminals 112 may be associated with four of the transmitter's input channels. Although only five output terminals 112 are shown in the demodulator 106 of FIG. 8, it is understood that the demodulator 106 may include any number of output terminals 112. For example, the demodulator 106 may also include an output terminal 112 associated with the temperature channel and an output terminal 112 associated with the reference channel. In addition, for embodiments in which the system 10 includes a receiver 14 used in conjunction with a transmitter 12 having eight input terminals, the demodulator 106 of the receiver 14 may have nine output terminals 112. According to such embodiments, the demodulator 106 would also include nine amplifier/filter circuits 120, nine low pass filter circuits 122, and nine D.C. block/buffer circuits 124—one set associated with the calibration channel and eight sets associated with the transmitter's input channels. For embodiments including the temperature circuit 74 and the reference circuit 76, the number of the amplifier/filter circuits 120, low pass filter circuits 122, and D.C. block/buffer circuits 124 would increase by two.

As illustrated in FIG. 8, the demodulator 106 may also include a 1/F converter connected between a low pass filter circuit 122 and a D.C. block/buffer circuit 124 in one or more of the signal channels to convert subcarrier oscillator frequency to period (linear) output.

Figure 9:
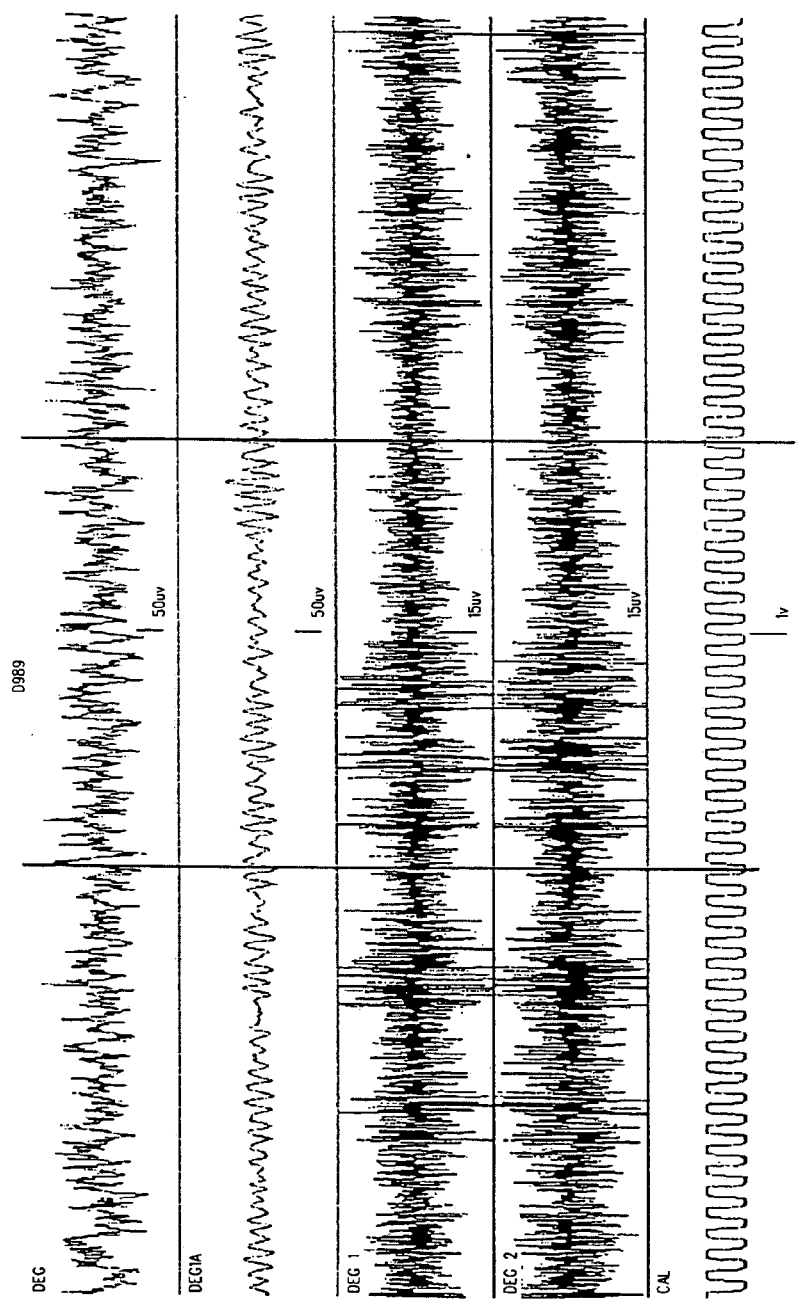
FIG. 9 illustrates one example of a recording of biopotentials obtained by using various embodiments of the multichannel wireless telemetric system of FIG. 1.

FIG. 9 illustrates one example of a recording of biopotentials obtained by using one embodiment of the multichannel wireless telemetric system 10. For this use, two C57BL/6J and two A/J mice (Jackson Laboratory, Bar Harbor, Me.) were anesthetized with isoflurane and chronically implanted with stainless steel electrodes for the recording of the cortical electrical activity (electroencephalogram; EEG) and electromyogram (EMG) of the nuchal muscles. The procedures used were approved by the IACUC of Louis Stokes Va. Research Center, Cleveland, Ohio and complied with the NIH "Guide for the Care and Use of Laboratory Animals."

A midline incision was made to expose the skull and neck muscles posterior to the skull. Four small holes (0.25 mm in diameter) were made, and stainless steel wires 0.21 mm in diameter and stripped for 0.5 mm at the ends were inserted into the holes and positioned to contact the dura. Bipolar recordings were made from an EEG anterior electrode placed 2 mm in front of bregma and 0.5 mm lateral of the midline, and from a posterior electrode positioned 2 mm behind bregma and 1 mm lateral of the midline. This placement was used to measure theta activity. For cortical EEG, an anterior electrode was placed 0.5 mm behind bregma and —2 mm lateral of the midline, while a posterior electrode was located 1 mm in front of lambda and —3 mm lateral of the midline. The stainless steel wires were knotted to form EMG electrodes. The knotted portion of the electrodes were thermally stripped, then sutured into the surface of the neck muscle posterior to the dorsal area of the mouse skull. The wires were secured and cemented by dental acrylic.

Each mouse was allowed 5 days to recover from surgery. After the 5 days had passed, the mice were brought to the laboratory at 8 a.m. and remained in the light for the recording period. For each mouse, the electrodes were connected to the associated transmitter 12 and the mouse was placed in a Lucite chamber (10 cm in diameter and 6 cm high) with bedding and access to food and water. Records were reviewed for signal integrity and scored for sleep stage. Each mouse was studied for three days, during which there was good signal integrity despite changes in light, temperature, and the ambient RF environment (sources of electrical interference).

As EEG and other potentials undergo typical changes during transition from sleep to wakefulness, for many studies it is important to have a clear recording of these neurophysiological patterns. The patterns illustrated in FIG. 9 show the cortical EEG, Theta activity, and nuchal EMG from a B6 mouse in active wakefulness. The calibration signal, at 5 Hz, is displayed on a fifth channel. Continued recordings permitting the staging of sleep-wake transitions, behavioral observations, and sleep staging were possible in all 4 animals. All stages of sleep were observed and length and percent of recording time spent in each state was equivalent to tethered recording performed in the same two strains (data not shown).

While several embodiments of the multichannel wireless telemetry system 10 have been described, it should be apparent, however, that various modifications, alterations and adaptations to those embodiments may occur to persons skilled in the art with the attainment of some or all of the advantages of the present invention. For example, various embodiments of the system 10 can accommodate both unipolar as well as bipolar signals. Various embodiments of the system 10 can accommodate temperature, pressure, and chemical sensors. Such sensors may be used with the system 10 to monitor and record a temperature associated with a particular animal, the blood pressure of a particular animal, and the concentration level of dissolved oxygen, glucose, or electrolytes present in the circulatory system of the animal. In addition, various embodiments of the system 10 may be used to the study of functional genomics in rodent models as well as other applications requiring wireless collection of biological and nonbiological variables. This application is therefore intended to cover all such modifications, alterations and adaptations without departing from the scope and spirit of the present invention as defined by the appended claims.

What is claimed is:

1. A miniaturized multi-channel transmitter, comprising:
   a signal processing chip, wherein the signal processing chip includes:
   a plurality of input preamplifiers;
   a plurality of selective second amplifiers, wherein each selective second amplifier is connected to a different input preamplifier;
   a subcarrier oscillator connected to the selective second amplifiers;
   a timing circuit connected to the subcarrier oscillator;
   a calibration circuit connected to the timing circuit; and
   a 1-of-several decoder connected to the timing circuit.

2. The transmitter of claim 1, wherein each of the preamplifiers includes an output terminal connected to a pair of input terminals of a different selective second amplifier.

3. The transmitter of claim 1, wherein each of the selective second amplifiers includes a pair of input terminals connected to an output terminal of a different preamplifier.

4. The transmitter of claim 3, wherein each of the selective second amplifiers includes a select terminal connected to the 1-of-several decoder.

5. The transmitter of claim 4, wherein each of the selective second amplifiers includes an output terminal connected to an input terminal of the subcarrier oscillator.

6. The transmitter of claim 1, wherein the subcarrier oscillator includes an input terminal connected to an output terminal of each of the selective second amplifiers and the calibration circuit.

7. The transmitter of claim 6, wherein the subcarrier oscillator is connected to first and second monostable multivibrators.

8. The transmitter of claim 7, wherein the subcarrier oscillator includes:
   a first clock terminal connected to the timing circuit; and
   a second clock terminal connected to one of the first and second monostable multivibrators.

9. The transmitter of claim 1, wherein the timing circuit includes a first plurality of toggle-connected flip-flops.

10. The transmitter of claim 9, wherein the flip-flops are type D flip-flops.

11. The transmitter of claim 1, wherein the calibration circuit includes an input terminal connected to the timing circuit.

12. The transmitter of claim 11, wherein the calibration circuit includes a select terminal connected to the 1-of-several decoder.

13. The transmitter of claim 1, wherein the calibration circuit includes an output terminal connected to an input terminal of the subcarrier oscillator.

14. The transmitter of claim 1, wherein the 1-of-several decoder is connected to a select terminal of each of the selective second amplifiers and the calibration circuit.

15. The transmitter of claim 1, wherein the signal processing chip further includes:
   a temperature circuit connected to the timing circuit; and
   a reference circuit connected to the timing circuit.

16. The transmitter of claim 15, wherein the temperature circuit includes a select terminal connected to the 1-of-several decoder.

17. The transmitter of claim 16, wherein the temperature circuit includes an output terminal connected to an input terminal of the subcarrier oscillator.

18. The transmitter of claim 15, wherein the reference circuit includes a select terminal connected to the 1-of-several decoder.

19. The transmitter of claim 18, wherein the reference circuit includes an output terminal connected to an input terminal of the 1-of-several decoder.

20. The transmitter of claim 1, wherein the signal processing chip further includes first and second monostable multivibrators connected to the subcarrier oscillator.

21. The transmitter of claim 20, wherein the first and second monstable multivibrators are connected to the timing circuit.

22. The transmitter of claim 1, wherein the signal processing chip further includes an on-off switch.

23. The transmitter of claim 22, wherein the on-off switch is a magnetically activated switch.

24. The transmitter of claim 1, wherein the signal processing chip is an application specific integrated circuit.

25. The transmitter of claim 24, wherein the signal processing chip is a BiCMOS chip.

26. The transmitter of claim 25, wherein the signal processing chip has a length less than or equal to 2 mm and a width less than or equal to 2 mm.

27. The transmitter of claim 1, further comprising a substrate having the signal processing chip mounted thereon.

28. The transmitter of claim 27, further comprising a radio frequency oscillator mounted on the substrate.

29. The transmitter of claim 28, wherein the radio frequency oscillator includes an input terminal connected to an output terminal of the signal processing chip.

30. The transmitter of claim 28, further comprising an antenna connected to an output terminal of the radio frequency oscillator.

31. The transmitter of claim 30, further comprising a switch activator mounted on the substrate.

32. The transmitter of claim 31, wherein the switch activator is a hall-effect magnetic sensor.

33. The transmitter of claim 31, further comprising a housing that encloses the substrate.

34. The transmitter of claim 33, wherein the housing includes a base portion and a lid portion connected to the base portion.

35. The transmitter of claim 34, wherein the base portion includes a plurality of microterminals.

36. The transmitter of claim 34, wherein the lid portion is slidably connected to the base portion.

37. The transmitter of claim 33, further comprising a battery enclosed by the housing.

38. The transmitter of claim 37, wherein the transmitter has a length less than or equal to 10 mm, a width less than or equal to 10 mm and a thickness less than or equal to 5 mm.

39. A miniaturized multi-channel wireless telemetry system, comprising:
   a transmitter, wherein the transmitter includes:
      a signal processing chip, wherein the signal processing chip includes:
         a plurality of input preamplifiers;
         a plurality of selective second amplifiers, wherein each selective second amplifier is connected to a different input preamplifier;
         a subcarrier oscillator connected to the selective second amplifiers;
         a timing circuit connected to the subcarrier oscillator;
         a calibration circuit connected to the timing circuit; and
         a 1-of-several decoder connected to the timing circuit; and
   a receiver in communication with the transmitter.

40. The system of claim 39, wherein the receiver includes:
   an antenna;
   a radio receiver connected to the antenna; and
   a demodulator connected to the radio receiver.

41. The system of claim 40, wherein the demodulator includes:
   a pulse separator circuit;
   a counter circuit connected to the pulse separator circuit;
   a digital-to-analog converter circuit connected to the counter circuit;
   a plurality of amplifier/filter circuits connected to the digital-to-analog converter circuit;
   a plurality low-pass filter circuits, wherein each of the low-pass filter circuits is connected to a different amplifier/filter circuit; and
   a plurality of block/buffer circuits, wherein each of the block/buffer circuits is connected to a different low-pass filter circuit.

42. The system of claim 41, wherein the demodulator further includes a plurality of 1/f converters, wherein each of the 1/f converters is connected to a different low pass filter circuit.

43. The system of claim 42, wherein each of the 1/f converters is connected to a different block/buffer circuit.

\* \* \* \* \*